US012572306B2

(12) United States Patent
Redaelli et al.

(10) Patent No.: US 12,572,306 B2
(45) Date of Patent: Mar. 10, 2026

(54) VERIFYING CHUNKS OF DATA BASED ON READ-VERIFY COMMANDS

(71) Applicant: Micron Technology, Inc., Boise, ID (US)

(72) Inventors: Marco Redaelli, Munich (DE); Daniela Ruggeri, Naples (IT)

(73) Assignee: Micron Technology, Inc., Boise, ID (US)

( * ) Notice: Subject to any disclaimer, the term of this patent is extended or adjusted under 35 U.S.C. 154(b) by 23 days.

(21) Appl. No.: 18/588,744

(22) Filed: Feb. 27, 2024

(65) Prior Publication Data

US 2024/0289056 A1      Aug. 29, 2024

Related U.S. Application Data

(60) Provisional application No. 63/487,136, filed on Feb. 27, 2023.

(51) Int. Cl.
G06F 3/06          (2006.01)
(52) U.S. Cl.
CPC .......... G06F 3/0659 (2013.01); G06F 3/0604 (2013.01); G06F 3/0679 (2013.01)

(58) Field of Classification Search
CPC .... G06F 3/0659; G06F 3/0604; G06F 3/0679; G06F 3/0614; G06F 3/0619; G06F 3/0658
See application file for complete search history.

(56) References Cited

U.S. PATENT DOCUMENTS

| | | | | |
|---|---|---|---|---|
| 2007/0174678 A1* | 7/2007 | King | .................... | G06F 11/1435 714/6.13 |
| 2011/0041005 A1* | 2/2011 | Selinger | ............... | G11C 29/765 714/48 |
| 2013/0151830 A1* | 6/2013 | Post | .................... | G06F 11/1435 713/2 |
| 2021/0224155 A1* | 7/2021 | Bains | .................. | G06F 11/1048 |
| 2022/0156143 A1* | 5/2022 | Zamir | ................. | G06F 13/1668 |
| 2022/0188005 A1* | 6/2022 | Esaka | ................... | G06F 3/0659 |
| 2022/0413748 A1* | 12/2022 | Senoo | ....................... | G06F 9/44 |
| 2023/0020521 A1* | 1/2023 | Park | .................... | G06F 11/1048 |

* cited by examiner

*Primary Examiner* — Tracy A Warren
(74) *Attorney, Agent, or Firm* — Harrity & Harrity, LLP

(57) ABSTRACT

In some implementations, a memory device may include a memory and a controller. The controller may receive, from a host device, a read-verify command. The controller may obtain, from the memory, a chunk of data based on the read-verify command. The controller may verify, based on the read-verify command, the chunk of data without transferring the chunk of data to the host device. The controller may provide, to the host device, an indication of a pass-fail status of the chunk of data based on the verification of the chunk of data.

20 Claims, 7 Drawing Sheets

100

Memory Device
120

Memory
140

Controller
130

Host Device
110

Memory Interface
160

Host Interface
150

Written

Deallocated

610 Receive, from a host device, a read-verify command

620 Obtain, from a memory, a chunk of data based on the read-verify command

630 Verify, based on the read-verify command, the chunk of data without transferring the chunk of data to the host device 640 Provide, to the host device, an indication of a pass-fail status of the chunk of data based on the verification of the chunk of data

600

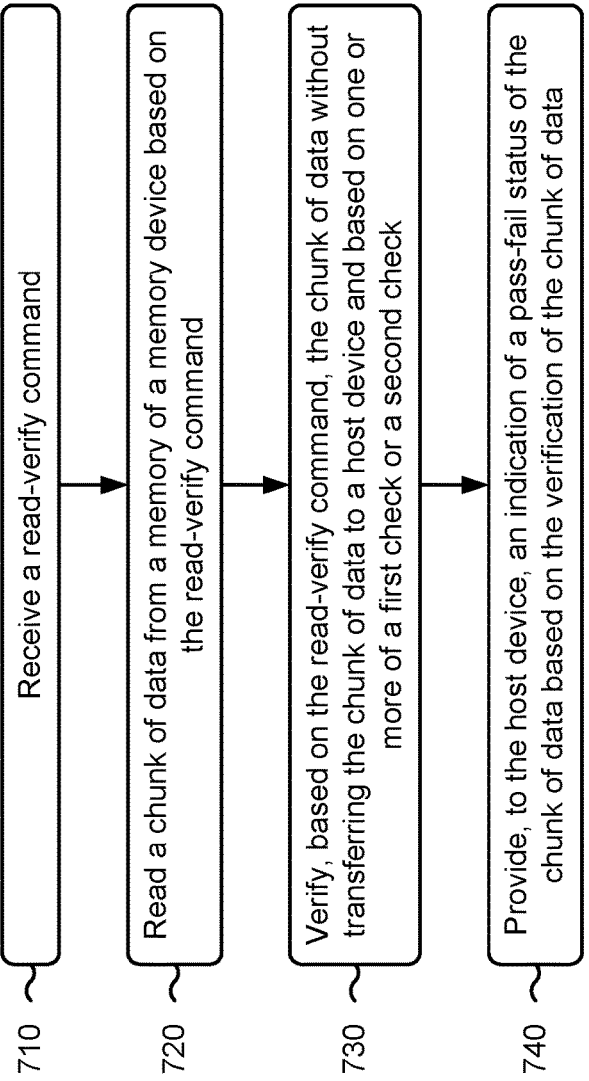

700

710 Receive a read-verify command

720 Read a chunk of data from a memory of a memory device based on the read-verify command 730 Verify, based on the read-verify command, the chunk of data without transferring the chunk of data to a host device and based on one or more of a first check or a second check 740 Provide, to the host device, an indication of a pass-fail status of the chunk of data based on the verification of the chunk of data

FIG. 7

VERIFYING CHUNKS OF DATA BASED ON READ-VERIFY COMMANDS

CROSS REFERENCE TO RELATED APPLICATION

This patent application claims priority to U.S. Provisional Patent Application No. 63/487,136, filed on Feb. 27, 2023, and entitled "VERIFYING CHUNKS OF DATA BASED ON READ-VERIFY COMMANDS." The disclosure of the prior application is considered part of and is incorporated by reference into this patent application.

TECHNICAL FIELD

The present disclosure generally relates to memory devices, memory device operations, and, for example, to verifying chunks of data based on read-verify commands.

BACKGROUND

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

BRIEF DESCRIPTION OF THE DRAWINGS

FIGS. 6-7 are flowcharts of example methods associated with verifying chunks of data based on read-verify commands.

DETAILED DESCRIPTION

Figure 1:
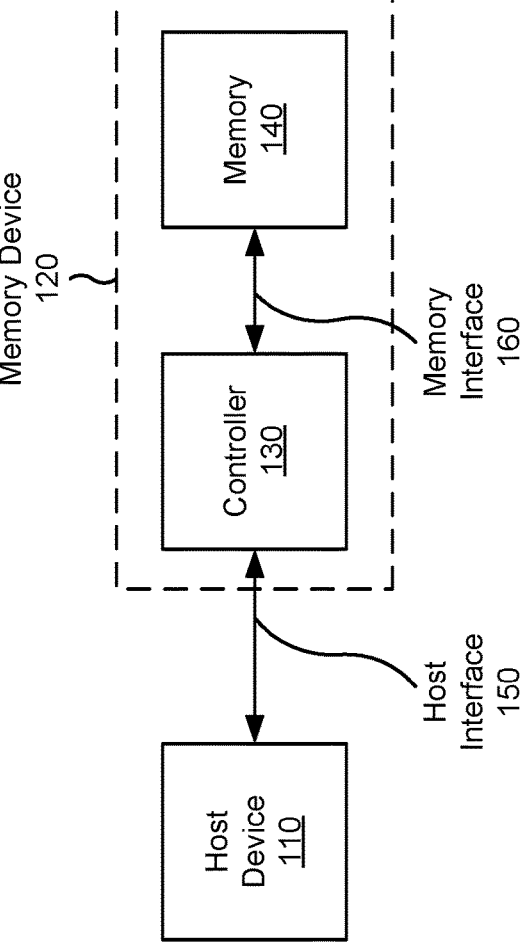
FIG. 1 is a diagram illustrating an example system capable of verifying chunks of data based on read-verify commands.

A host device may write (or program) data to a memory of a memory device. The memory device may be a managed non-volatile memory (mNVM) device. The host device may write the data to the memory via a controller of the memory device. At a later point in time, the host device may want to verify that the data written to the memory has not been corrupted or changed. In this case, the controller may read the data from the memory, and transfer the data to the host device. After the data has been transferred to the host device, the host device may verify that the data has not been corrupted or changed. In other words, the host device may perform a read-verify operation, which may involve reading the data (via the controller) and verifying the data.

In some cases, such a read-verify operation may be relatively slow because the data has to be transferred back to the host device before the data is able to be verified. Further, such a read-verify operation may be hardware intensive, because a potentially large amount of data needs to be transferred from the memory device to the host device in order to complete the read-verify operation.

As an example, mNVM users may be required to check whether programmed data has become corrupted or has changed. The programmed data may be checked in production or during a system lifetime. The programmed data may be checked using a cyclic redundancy code (CRC) check, which may involve reading out the programmed data. Such a read-verify operation may be relatively slow at a protocol level because a relatively large data transfer is required from an mNVM device to the host device for CRC calculation. Further, extensive hardware may be needed from the host device perspective in order to perform the CRC calculation.

A first scenario may involve a programmer equipment verify flow. For factory programming performed on programmer equipment, a data integrity check involving a binary image read-verify operation after an image download may be a time-consuming operation. A second scenario may involve an mNVM data integrity check. Users may be required to check whether data has become corrupted, which may be a relatively slow operation because data read at the protocol level may include the transfer of data from the mNVM device to the host device. A third scenario may involve a quality process initiated by the customer, which may require a supplier to analyzed suspected failed devices. In the third scenario, a data integrity check may be performed by scanning/reading the memory on a suspected failed device using high speed and expensive equipment. In all three scenarios, a data integrity check may be required, which may involve a data transfer from the memory to the host device. The data transfer may be relatively slow due to a relatively large size of the data (e.g., multiple gigabytes of data). Even when high-speed equipment is used, high hardware cost may be an issue. The hardware may be relatively costly due to the use of controlled impedance and multi-layer printed circuit boards (PCB), high speed sockets, and/or high performances application-specific integrated circuits (ASIC) or systems on chips (SOCs).

A NOR flash memory device may implement a verify via an embedded CRC check command, which may provide a faster memory verify check, as compared to transferring data to the host device. However, this approach adds cost and complexity to the design (e.g., due to added circuitry on a NOR die). Further, this approach may not be useful for mNVM because mNVM implements a full data path protection scheme. The full data path protection scheme may be applied between the host device and the memory, and may apply to commands issued by the host device. In other words, commands from the host device may be protected by a strong and redundant CRC check based on the full data path protection scheme. This full data path protection scheme may be leveraged to provide a read-verify solution with reduced cost and design complexity for both the host device and the mNVM device, as compared to using the embedded CRC check command (as in the NOR flash device).

In some implementations, a read-verify command may be employed, which may be used to verify a chunk data stored in memory that was previously written by a host device using a regular programming command, which may have included a data transfer due to an intrinsic nature of the programming command. The memory may have been programmed in a regular manner with specific content, for example, during a manufacturing phase. The host device (e.g., programmer equipment) may be instructed to verify the content that was programmed in the memory. A controller may receive, from the host device, the read-verify command. After receiving the read-verify command, the controller may read out the chunk of data from the memory. The controller may verify the chunk of data without transferring the chunk of data to the host device. The controller may perform a first check and/or a second check when verifying the chunk of data, which may not involve transferring the chunk of data to the host device. The read-verify command may aid with the verification of the previously programmed data, in a reduced amount of time, because the verification may not involve data transfer to the host device and may be performed using a full data path protection.

In some implementations, when performing the first check, the controller may determine whether the chunk of data is associated with an unrecovered read error. An unrecovered read error (or uncorrectable error correcting code (UECC) error) may mean that the chunk of data could not be recovered from the memory. The controller may perform the first check via an error correcting code (ECC) engine within the controller, which may be used to check whether the chunk of data is able to be corrected.

In some implementations, when performing the second check, the controller may determine whether the chunk of data is associated with a deallocated or unwritten logical block, which may mean that an attempt has been made to read from a logical block address (LBA) range containing a deallocated or unwritten logical block. The controller may determine whether the chunk of data is associated with the deallocated or unwritten logical block using a map of unallocated LBAs (e.g., a bitmap of unallocated chunks of LBAs).

In some implementations, when the chunk of data is associated with the unrecovered read error and/or the chunk of data is associated with the deallocated or unwritten logical block, the chunk of data may be associated with a fail status. The fail status may indicate that the chunk of data is corrupted or has changed since initially programmed. When the data is not associated with the unrecovered read error and/or the data is not associated with the deallocated or unwritten logical block, the data may be associated with a pass status. The pass status may indicate that the chunk of data is not corrupted and has not changed since initially programmed. The status (pass or fail) may be indicated to the host device via a status register. For example, a status of "deallocated or unwritten logical block" may be reported to the host device via the status register, and/or a status of "unrecovered read error" may be reported to the host device via the status register. Based on the read-verify command, the controller may verify each chunk of data. When a chunk of data is successfully verified and results in a pass status, the controller may provide the pass status to the host device via the status register, and the controller may begin to verify a next chunk of data. When a chunk of data produces a fail status, the controller may provide the fail status to the host device via the status register.

In some implementations, the read-verify command may not involve transferring chunks of data to the host device. Instead, a pass-fail status of the read-verify command against an internal ECC may be provided via the status register. Further, any CRC code or ECC that is calculated on a data payload may be made available via the status register. Further, the read-verify command may cause a reporting back into the status register, in case of an unallocated LBA range (e.g., a read out from an LBA range of 00H to FFH). The reporting may include a flag, which may notify that the LBA range was not programmed (e.g., never programmed).

In some implementations, such a read-verify operation may result in a smaller read-verify time, because the read-verify operation may not involve transferring chunks of data to the host device. Such a read-verify operation reduce a hardware design cost, as compared to the read-verify operation that involves the transfer of chunks of data to the host device. Such a read-verify operation may result in an increased system diagnostic capability, and higher production throughput with lower cost programmer equipment, as compared to the read-verify operation that involves the transfer of chunks of data to the host device. Further, such a read-verify operation may be used by quality process teams to achieve a faster UECC check mechanism, as compared to the read-verify operation that involves the transfer of chunks of data to the host device.

FIG. 1 is a diagram illustrating an example system 100 capable of verifying chunks of data based on read-verify commands. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an ASIC, and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or a managed NAND, such as an embedded multimedia card (eMMC) device or a unified flash storage (UFS) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a UFS interface, and/or an eMMC interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to receive, from the host device 110, a read-verify command; obtain, from the memory 140, a chunk of data based on the read-verify command; verify, based on the read-verify command, the chunk of data without transferring the chunk of data to the host device 110; and provide, to the host device 110, an indication of a pass-fail status of the chunk of data based on the verification of the chunk of data.

In some implementations, the memory device 120 and/or the controller 130 may be configured to receive, from the host device 110, a read-verify command; read a chunk of data from the memory 140 of the memory device 120 based on the read-verify command; verify, based on the read-verify command, the chunk of data without transferring the chunk of data to the host device 110 and based on one or more of a first check or a second check; and provide, to the host device 110, an indication of a pass-fail status of the chunk of data based on the verification of the chunk of data.

In some implementations, the host device 110 may be configured to provide a read-verify command. The memory device 120 and/or the controller 130 may be configured to receive, from the host device 110, the read-verify command; obtain, from the memory 140 associated with the memory device 120, a chunk of data based on the read-verify command; verify, based on the read-verify command, the chunk of data without transferring the chunk of data to the host device 110; and provide, to the host device 110, an indication of a pass-fail status of the chunk of data based on the verification of the chunk of data.

As indicated above, FIG. 1 is provided as an example. Other examples may differ from what is described with regard to FIG. 1.

Figure 2:
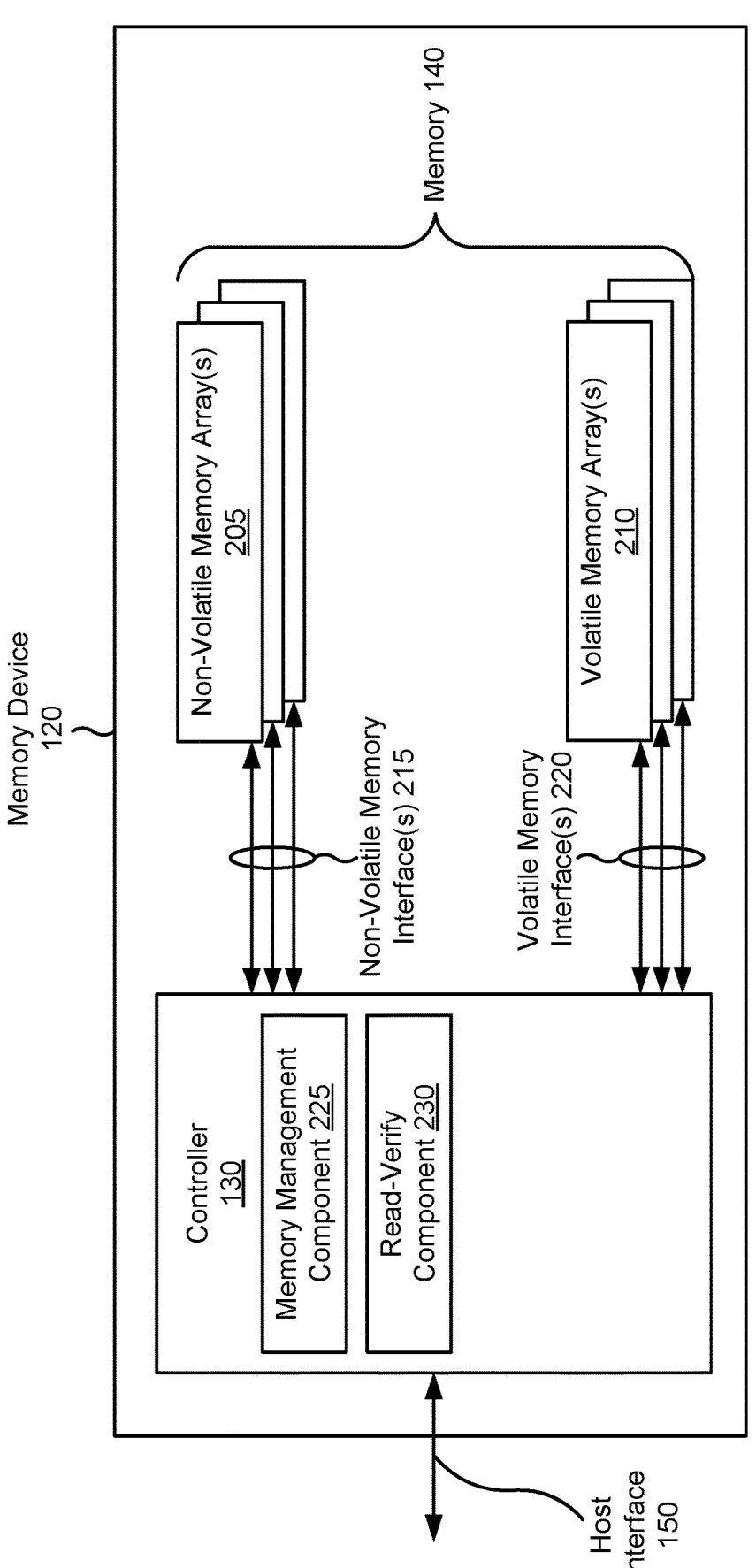
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, and/or a read-verify component 230. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The read-verify component 230 may be configured to receive, from the host device 110, a read-verify command; obtain, from the memory 140, a chunk of data based on the read-verify command; verify, based on the read-verify command, the chunk of data without transferring the chunk of data to the host device 110; and provide, to the host device

110, an indication of a pass-fail status of the chunk of data based on the verification of the chunk of data.

The read-verify component 230 may be configured to receive, from the host device 110, a read-verify command; read a chunk of data from the memory 140 of the memory device 120 based on the read-verify command; verify, based on the read-verify command, the chunk of data without transferring the chunk of data to the host device 110 and based on one or more of a first check or a second check; and provide, to the host device 110, an indication of a pass-fail status of the chunk of data based on the verification of the chunk of data.

One or more devices or components shown in FIG. 2 may be configured to perform operations described herein, such as one or more operations and/or methods described in connection with FIGS. 3-7. For example, the controller 130, the memory management component 225, and/or a read-verify component 230 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
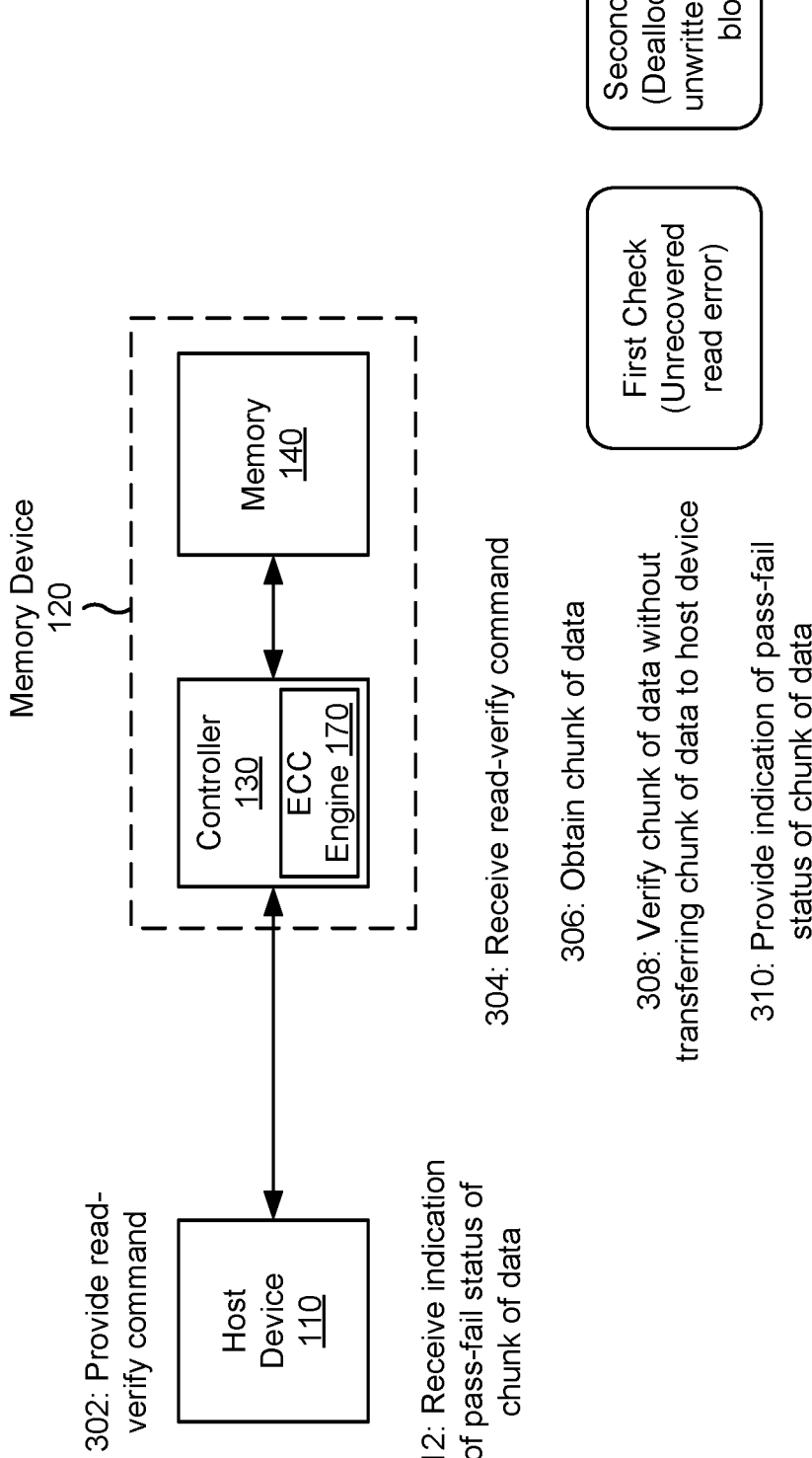
FIGS. 3-5 are diagram of examples of verifying chunks of data based on read-verify commands.

FIG. 3 is a diagram of an example 300 of verifying chunks of data based on read-verify commands. The operations described in connection with FIG. 3 may be performed by the memory device 120 and/or one or more components of the memory device 120, such as the controller 130 and/or one or more components of the controller 130. The memory device 120 may be an mNVM device or a NAND device.

As shown by reference number 302, the host device 110 may provide a read-verify command. The read-verify command may be to read data that has been programmed (or written) to the memory 140 of the memory device 120, and the read-verify command may be to verify that data. In other words, the read-verify command may be to check whether the data has become corrupted or has changed since the time the data was programmed to the memory 140. The host device 110 may provide the read-verify command when the memory device 120 is in production or during a system lifetime.

As shown by reference number 304, a controller 130 of the memory device 120 may receive the read-verify command from the host device 110. A path between the host device 110 and the controller 130 may be a full data protection path, such that any protocol level command, such as the read-verify command, may be protected by a strong and redundant CRC check.

As shown by reference number 306, the controller 130 may obtain a chunk of data from the memory 140 based on the read-verify command. In other words, the controller 130 may read the chunk of data from the memory 140 based on the read-verify command. The controller 130 may not transfer the chunk of data to the host device 110 after obtaining the chunk of data from the memory 140.

As shown by reference number 308, the controller 130 may verify, based on the read-verify command, the chunk of data without transferring the chunk of data to the host device. The controller 130 may verify the chunk of data based on a first check and/or a second check. The controller 130, when verifying the chunk of data based on the first check, may verify whether the chunk of data is associated with an unrecovered read error based on a first status code associated with the chunk of data. The first status code may indicate the unrecovered read error, which may indicate that the chunk of data could not be recovered from the memory 140. When performing the first check, the controller 130 may determine whether the chunk of data is associated with the unrecovered read error. The controller 130, when verifying the chunk of data based on the second check, may verify, using a bitmap of unallocated chunks of logical block addresses, whether the chunk of data is associated with a deallocated or unwritten logical block based on a second status code associated with the chunk of data. The bitmap may define chunks of logical block addresses that are allocated or mapped, and the bitmap may define chunks of logical block addresses that are deallocated or unmapped. The bitmap may be stored on the controller 130. The second status code may indicate the deallocated or unwritten logical block, which may mean that the read-verify command failed due to an attempt to read from an LBA range containing a deallocated or unwritten logical block, which may be indicated by the bitmap. When performing the second check, the controller 130 may determine whether the chunk of data is associated with the deallocated or unwritten logical block. In some cases, the controller 130 may perform both the first check and the second check. Alternatively, the controller 130 may only perform the first check, and the controller 130 may not perform the second check.

In some implementations, "deallocated or unwritten logical block" may refer to a deallocated logical block or an unwritten logical block. In other words, the deallocated or unwritten logical block may refer to a logical block or a portion of memory that has not been programmed (e.g., never programmed).

In some implementations, the controller 130 may include an ECC engine 170. The ECC engine 170 may be an embedded engine of the controller 130. The ECC engine 170 may be used to perform the first check, which may involve checking whether the chunk of data is associated with the unrecovered read error. The ECC engine 170 may determine whether the chunk of data is able to be corrected. The ECC engine 170 may determine that an ECC may be applied to correct the chunk of data, which may result in the chunk of data being associated with the pass status. The chunk of data, which may be associated with corruption or changed data, may be corrected via the ECC engine 170. The ECC engine 170 may output a status of correction (e.g., a pass or a fail). For example, the ECC engine 170 may indicate that the chunk of data is able to be corrected. Alternatively, the ECC engine 170 may indicate that the chunk of data cannot be corrected.

In some implementations, the controller 130 may determine a pass-fail status of the chunk of data based on the verification of the chunk of data. The controller 130 may determine a pass status of the chunk of data based on the chunk of data not being associated with the unrecovered read error. The controller 130 may determine the pass status of the chunk of data based on the chunk of data not being associated with the unrecovered read error, and based on the chunk of data not being associated with the deallocated or unwritten logical block. The controller 130 may determine a fail status of the chunk of data based on the chunk of data being associated with the unrecovered read error and/or based on the chunk of data being associated with the deallocated or unwritten logical block.

As shown by reference number 310, the controller 130 may provide, to the host device 110, an indication of the pass-fail status of the chunk of data based on the verification of the chunk of data. The controller 130 may provide an indication of the pass status of the chunk of data based on the chunk of data not being associated with the unrecovered read error. The controller 130 may provide an indication of the pass status of the chunk of data based on the chunk of data not being associated with the unrecovered read error, and based on the chunk of data not being associated with the deallocated or unwritten logical block. The controller 130 may provide an indication of the fail status based on the chunk of data being associated with the unrecovered read error and/or based on the chunk of data being associated with the deallocated or unwritten logical block.

In some implementations, the controller 130 may provide the indication of the pass-fail status of the chunk of data via a status register. The controller 130 may provide the indication of the pass status via the status register based on the first check and/or the second check. The controller 130 may provide the indication of the fail status via the status register based on the first check and/or the second check. The controller may provide the indication of the pass-fail status of the read-verify command against an internal ECC via the status register. In some implementations, the controller 130 may provide, to the host device 110, a flag indicating that the chunk of data is associated with the deallocated or unwritten logical block. In other words, the flag may indicate that the chunk of data corresponds to a certain range of memory that was not programmed, and hence the chunk of data may be associated with the fail status.

In some implementations, the chunk of data may be one of a plurality of chunks of data to be read and verified based on the read-verify command. The controller 130 may verify the chunk of data based on the pass-fail status of the chunk of data. The controller 130 may verify a next chunk of data based on the pass-fail status of the next chunk of data. For example, when the chunk of data is associated with the pass status, the controller 130 may move to the next chunk of data. When the chunk of data is associated with the fail status, the controller 130 may generate an error message or terminate the read-verify command. In other words, the controller 130 may continue with or terminate the read-verify command based on the pass-fail status of a last chunk of data.

As shown by reference number 312, the host device 110 may receive, from the controller 130, the indication of the pass-fail status of the chunk of data. The host device 110 may receive the indication of the pass status or the indication of the fail status, depending on whether the chunk of data is associated with the unrecovered read error and/or the deallocated or unwritten logical block.

In some implementations, the controller 130 may use the first check and/or the second check to verify the chunk of data that was previously programmed in the memory 140. The controller 130 may use the first check and/or the second check in lieu of transferring the chunk of data to the host device 110, which would otherwise perform a CRC check on the chunk of data. By not having to transfer chunks of data to the host device 110, the read-verify operation may be performed in a shorter period of time and may avoid the use of complex hardware used for transferring the chunks of data between the controller 130 and the host device 110.

As indicated above, FIG. 3 is provided as an example. Other examples may differ from what is described with regard to FIG. 3.

Figure 4:
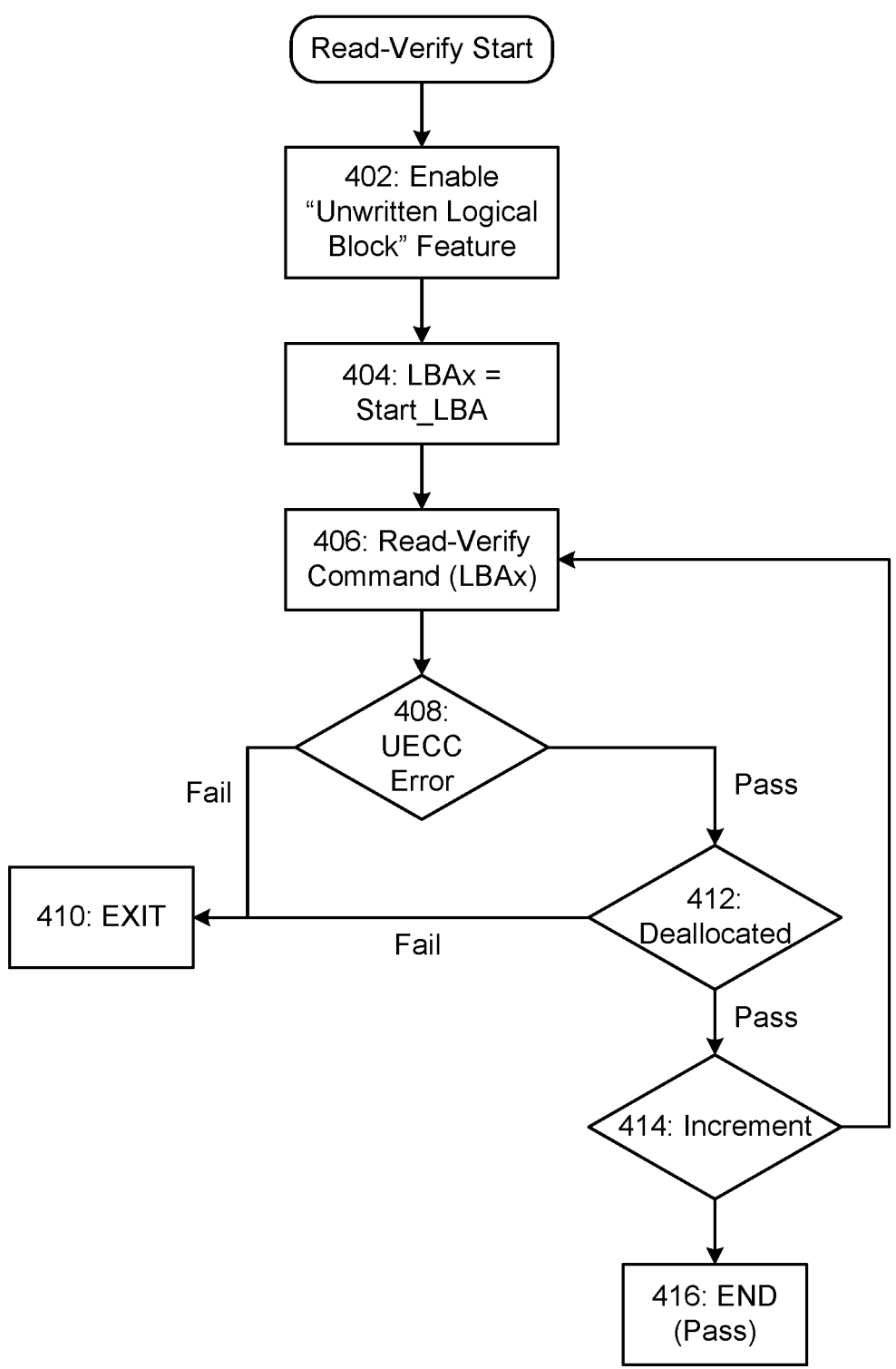

FIG. 4 is a diagram of an example 400 of verifying chunks of data based on read-verify commands. The operations described in connection with FIG. 4 may be performed by the memory device 120 and/or one or more components of the memory device 120, such as the controller 130 and/or one or more components of the controller 130.

As shown by reference number 402, a controller (e.g., controller 130) may enable an unwritten logical block feature, which may be based on a start of a read-verify flow. The unwritten logical block feature may be enabled in order to check whether a chunk of data is associated with an unwritten logical block, and thus would be associated with a fail status. As shown by reference number 404, the controller may start reading at a starting LBA (e.g., LBAx, which may correspond to the starting LBA), which may be associated with the chunk of data. As shown by reference number 406, the controller may apply a read-verify command at the starting LBA. As shown by reference number 408, the controller may check a status code associated with an unrecovered read error. In other words, the controller may determine whether the chunk of data associated with the starting LBA produces the status code associated with the unrecovered read error. A presence of the unrecovered read error may indicate that the chunk of data could not be recovered at the starting LBA. In other words, the controller may verify that the chunk of data associated with the starting LBA does not report an UECC error. When the chunk of data is associated with the UECC error, the chunk of data may be corrupted or may have changed after an initial programming. The controller may check the chunk of data for the unrecovered read error without transferring the chunk of data to a host device.

As shown by reference number 410, when the chunk of data is associated with the unrecovered read error, the controller may exit the read-verify flow due to an LBA read error. As shown by reference number 412, when the chunk of data is not associated with the unrecovered read error, the controller may determine whether the chunk of data associated with the starting LBA produces a status code associated with a deallocated or unwritten logical block. In other words, the controller may determine whether the chunk of data associated with the starting LBA produces the status code associated with the deallocated or unwritten logical block. The controller may check a bitmap, which may indicate a map of unallocated LBAs versus written LBAs (e.g., LBAs in which data is written). When the chunk of data is associated with the deallocated or unwritten logical block, the controller may exit the read-verify flow due to an unallocated map check error (as shown by reference number 410). The controller may check the chunk of data for the deallocated or unwritten logical block without transferring the chunk of data to a host device. As shown by reference number 414, when the chunk of data is not associated with the deallocated or unwritten logical block, the controller may increment the LBA. The controller may move to a next (or subsequent) LBA, which may occur prior to a last LBA. The controller may apply the read-verify command at the next LBA, and the process may be repeated. As shown by reference number 416, after applying the read-verify command to a plurality of LBAs, the controller may exit the read-verify flow.

As indicated above, FIG. 4 is provided as an example. Other examples may differ from what is described with regard to FIG. 4.

Figure 5:
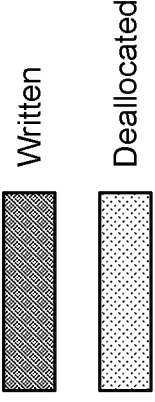
Figure 5:
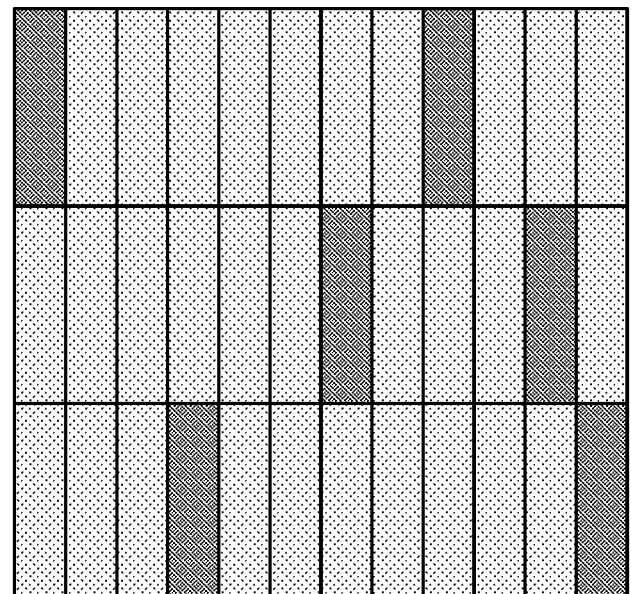

FIG. 5 is a diagram of an example 500 of verifying chunks of data based on read-verify commands. The operations described in connection with FIG. 5 may be performed by the memory device 120 and/or one or more components of the memory device 120, such as the controller 130 and/or one or more components of the controller 130.

As shown in FIG. 5, a map may indicate written LBAs versus unallocated (or deallocated) LBAs. The map may indicate written LBAs versus unallocated LBAs with a certain granularity (e.g., a 128 KB granularity). The map may be represented using a bitmap of unallocated chunks of logical block addresses. The map may be accessed by a controller when a read-verify command is applied to a chunk of data associated with an LBA. When the controller is checking the LBA, the controller may access the bitmap to determine whether that LBA corresponds to a written portion of the memory or to an unwritten (or unallocated or deallocated) portion of the memory. When the chunk if data is associated with an LBA that is indicated as being unwritten, a fail status for the chunk of data may be generated and indicated to a host device via a status register. As a result, the host device may be notified that the chunk of data is associated with the fail status.

As indicated above, FIG. 5 is provided as an example. Other examples may differ from what is described with regard to FIG. 5.

Figure 6:
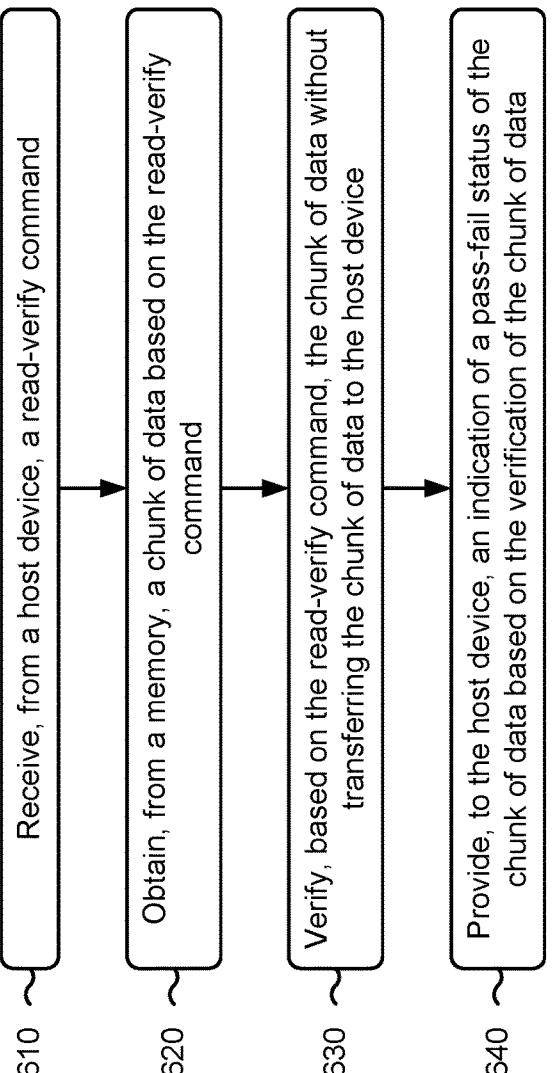

FIG. 6 is a flowchart of an example method 600 associated with verifying chunks of data based on read-verify commands. In some implementations, a memory device (e.g., the memory device 120) may perform or may be configured to perform the method 600. In some implementations, another device or a group of devices separate from or including the memory device (e.g., the system 100) may perform or may be configured to perform the method 600. Additionally, or alternatively, one or more components of the memory device (e.g., the controller 130, the memory management component 225, and/or read-verify component 230) may perform or may be configured to perform the method 600. Thus, means for performing the method 600 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 600.

As shown in FIG. 6, the method 600 may include receiving, from a host device, a read-verify command (block 610). As further shown in FIG. 6, the method 600 may include obtaining, from a memory, a chunk of data based on the read-verify command (block 620). As further shown in FIG. 6, the method 600 may include verifying, based on the read-verify command, the chunk of data without transferring the chunk of data to the host device (block 630). As further shown in FIG. 6, the method 600 may include providing, to the host device, an indication of a pass-fail status of the chunk of data based on the verification of the chunk of data (block 640).

The method 600 may include additional aspects, such as any single aspect or any combination of aspects described below and/or described in connection with one or more other methods or operations described elsewhere herein.

In a first aspect, the method 600, when verifying the chunk of data, includes determining whether the chunk of data is associated with an unrecovered read error based on a status code associated with the chunk of data.

In a second aspect, alone or in combination with the first aspect, the method 600, when providing the indication of the pass-fail status of the chunk of data, includes providing an indication of a pass status of the chunk of data based on the chunk of data not being associated with the unrecovered read error.

In a third aspect, alone or in combination with one or more of the first and second aspects, the method 600, when providing the indication of the pass-fail status of the chunk of data, includes providing an indication of a fail status of the chunk of data based on the chunk of data being associated with the unrecovered read error.

In a fourth aspect, alone or in combination with one or more of the first through third aspects, the method 600, when verifying the chunk of data, includes determining whether the chunk of data is associated with an unrecovered read error based on a first status code associated with the chunk of data, and determining, using a bitmap of unallocated chunks of logical block addresses, whether the chunk of data is associated with a deallocated or unwritten logical block based on a second status code associated with the chunk of data.

In a fifth aspect, alone or in combination with one or more of the first through fourth aspects, the method 600, when providing the indication of the pass-fail status of the chunk of data, includes providing an indication of a pass status of the chunk of data based on the chunk of data not being associated with the unrecovered read error and based on the chunk of data not being associated with the deallocated or unwritten logical block.

In a sixth aspect, alone or in combination with one or more of the first through fifth aspects, the method 600, when providing the indication of the pass-fail status of the chunk of data, includes providing an indication of a fail status of the chunk of data based on one or more of the chunk of data being associated with the unrecovered read error, or the chunk of data being associated with the deallocated or unwritten logical block.

In a seventh aspect, alone or in combination with one or more of the first through sixth aspects, the method 600 includes providing, to the host device, a flag indicating that the chunk of data is associated with the deallocated or unwritten logical block.

In an eighth aspect, alone or in combination with one or more of the first through seventh aspects, the chunk of data is a first chunk of data, and the method 600 includes verifying, based on the read-verify command, a second chunk of data based on the pass-fail status of the first chunk of data, or terminating the read-verify command based on the pass-fail status of the first chunk of data.

In a ninth aspect, alone or in combination with one or more of the first through eighth aspects, the memory device is a managed non-volatile memory (mNVM) device.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

FIG. 7 is a flowchart of an example method 700 associated with verifying chunks of data based on read-verify commands. In some implementations, a memory device (e.g., the memory device 120) may perform or may be configured to perform the method 700. In some implementations, another device or a group of devices separate from or including the memory device (e.g., the system 100) may perform or may be configured to perform the method 700. Additionally, or alternatively, one or more components of the memory device (e.g., the controller 130, the memory management component 225, and/or read-verify component 230) may perform or may be configured to perform the method 700. Thus, means for performing the method 700 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 700.

As shown in FIG. 7, the method 700 may include receiving a read-verify command (block 710). As further shown in FIG. 7, the method 700 may include reading a chunk of data from a memory of a memory device based on the read-verify command (block 720). As further shown in FIG. 7, the method 700 may include verifying, based on the read-verify command, the chunk of data without transferring the chunk of data to a host device and based on one or more of a first check or a second check (block 730). As further shown in FIG. 7, the method 700 may include providing, to the host device, an indication of a pass-fail status of the chunk of data based on the verification of the chunk of data (block 740).

The method 700 may include additional aspects, such as any single aspect or any combination of aspects described below and/or described in connection with one or more other methods or operations described elsewhere herein.

In a first aspect, method 700 includes verifying whether the chunk of data is associated with an unrecovered read error based on a status code associated with the chunk of data.

In a second aspect, alone or in combination with the first aspect, method 700 includes providing the indication of the pass-fail status of the chunk of data based on whether the chunk of data is associated with the unrecovered read error.

In a third aspect, alone or in combination with one or more of the first and second aspects, method 700 includes verifying, using a bitmap of unallocated chunks of logical block addresses, whether the chunk of data is associated with a deallocated or unwritten logical block based on a second status code associated with the chunk of data.

In a fourth aspect, alone or in combination with one or more of the first through third aspects, method 700 includes providing the indication of the pass-fail status of the chunk of data based on whether the chunk of data is associated with the deallocated or unwritten logical block.

In a fifth aspect, alone or in combination with one or more of the first through fourth aspects, method 700 includes providing the pass-fail status of the read-verify command against an internal ECC via a status register.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein.

In some implementations, a memory device includes memory; and a controller configured to: receive, from a host device, a read-verify command; obtain, from the memory, a chunk of data based on the read-verify command; verify, based on the read-verify command, the chunk of data without transferring the chunk of data to the host device; and provide, to the host device, an indication of a pass-fail status of the chunk of data based on the verification of the chunk of data.

In some implementations, a method includes receiving, by a memory device from a host device, a read-verify command; reading, by the memory device, a chunk of data from a memory of the memory device based on the read-verify command; verifying, based on the read-verify command, the chunk of data without transferring the chunk of data to the host device and based on one or more of a first check or a second check; and providing, to the host device, an indication of a pass-fail status of the chunk of data based on the verification of the chunk of data.

In some implementations, a system includes a host device configured to: provide a read-verify command; a memory device configured to: receive, from the host device, the read-verify command; obtain, from a memory associated with the memory device, a chunk of data based on the read-verify command; verify, based on the read-verify command, the chunk of data without transferring the chunk of data to the host device; and provide, to the host device, an indication of a pass-fail status of the chunk of data based on the verification of the chunk of data.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
memory; and
a controller configured to:
    receive, from a host device, a read-verify command;
    obtain, from the memory, a chunk of data based on the read-verify command;
    verify, based on the read-verify command, the chunk of data without transferring the chunk of data to the host device, wherein, to verify the chunk of data, the controller is further configured to:
        perform a first check to determine whether the chunk of data is associated with an unrecovered read error; and
        perform a second check to determine whether the chunk of data is associated with a deallocated or unwritten logical block; and
    provide, to the host device, an indication of a pass-fail status of the chunk of data based on verification of the chunk of data.

2. The memory device of claim 1,
wherein the controller, to verify the chunk of data, is configured to:
    determine whether the chunk of data is associated with the unrecovered read error based on a status code associated with the chunk of data.

3. The memory device of claim 2,
wherein the controller, to provide the indication of the pass-fail status of the chunk of data, is configured to:
    provide an indication of a pass status of the chunk of data based on the chunk of data not being associated with the unrecovered read error.

4. The memory device of claim 2,
wherein the controller, to provide the indication of the pass-fail status of the chunk of data, is configured to:
    provide an indication of a fail status of the chunk of data based on the chunk of data being associated with the unrecovered read error.

5. The memory device of claim 1,
wherein the controller, to verify the chunk of data, is configured to:
    determine whether the chunk of data is associated with the unrecovered read error based on a first status code associated with the chunk of data; and
    determine, using a bitmap of unallocated chunks of logical block addresses, whether the chunk of data is associated with the deallocated or unwritten logical block based on a second status code associated with the chunk of data.

6. The memory device of claim 5,
wherein the controller, to provide the indication of the pass-fail status of the chunk of data, is configured to:
    provide an indication of a pass status of the chunk of data based on the chunk of data not being associated with the unrecovered read error and based on the chunk of data not being associated with the deallocated or unwritten logical block.

7. The memory device of claim 5,
wherein the controller, to provide the indication of the pass-fail status of the chunk of data, is configured to:
    provide an indication of a fail status of the chunk of data based on one or more of: the chunk of data being associated with the unrecovered read error, or the chunk of data being associated with the deallocated or unwritten logical block.

8. The memory device of claim 5, wherein the controller is configured to:

provide, to the host device, a flag indicating that the chunk of data is associated with the deallocated or unwritten logical block.

9. The memory device of claim 1, wherein the chunk of data is a first chunk of data, and wherein the controller is configured to:

verify, based on the read-verify command, a second chunk of data based on the pass-fail status of the first chunk of data; or terminate the read-verify command based on the pass-fail status of the first chunk of data.

10. The memory device of claim 1, wherein the memory device is a managed non-volatile memory (mNVM) device.

11. A method, comprising:

receiving, by a memory device from a host device, a read-verify command;

reading, by the memory device, a chunk of data from a memory of the memory device based on the read-verify command;

verifying, based on the read-verify command, the chunk of data without transferring the chunk of data to the host device and based on a first check to determine whether the chunk of data is associated with an unrecovered read error and a second check to determine whether the chunk of data is associated with a deallocated or unwritten logical block; and providing, to the host device, an indication of a pass-fail status of the chunk of data based on the verification of the chunk of data.

12. The method of claim 11, wherein verifying the chunk of data based on the first check further comprises:

verifying whether the chunk of data is associated with the unrecovered read error based on a status code associated with the chunk of data.

13. The method of claim 12, wherein providing the indication of the pass-fail status of the chunk of data is based on whether the chunk of data is associated with the unrecovered read error.

14. The method of claim 11, wherein verifying the chunk of data based on the second check further comprises:

verifying, using a bitmap of unallocated chunks of logical block addresses, whether the chunk of data is associated with the deallocated or unwritten logical block based on a second status code associated with the chunk of data.

15. The method of claim 14, wherein providing the indication of the pass-fail status of the chunk of data is based on whether the chunk of data is associated with the deallocated or unwritten logical block.

16. The method of claim 11, wherein providing the indication of the pass-fail status of the chunk of data comprises providing the pass-fail status of the read-verify command against an internal error correcting code (ECC) via a status register.

17. A system, comprising:

a host device configured to:

provide a read-verify command; and a memory device configured to:

receive, from the host device, the read-verify command;

obtain, from a memory associated with the memory device, a chunk of data based on the read-verify command;

verify, based on the read-verify command, the chunk of data without transferring the chunk of data to the host device, wherein, to verify the chunk of data, the memory device is further configured to:

perform a first check to determine whether the chunk of data is associated with an unrecovered read error; and perform a second check to determine whether the chunk of data is associated with a deallocated or unwritten logical block; and provide, to the host device, an indication of a pass-fail status of the chunk of data based on verification of the chunk of data.

18. The system of claim 17, wherein the memory device, to verify the chunk of data, is configured to:

verify whether the chunk of data is associated with the unrecovered read error based on a status code associated with the chunk of data; and verify, using a bitmap of unallocated chunks of logical block addresses, whether the chunk of data is associated with the deallocated or unwritten logical block based on a second status code associated with the chunk of data.

19. The system of claim 18, wherein the memory device is configured to:

provide the indication of the pass-fail status of the chunk of data based on whether the chunk of data is associated with the unrecovered read error and based on whether the chunk of data is associated with the deallocated or unwritten logical block.

20. The system of claim 17, wherein the memory device is a NAND device.

* * * * *